(12) United States Patent
Dondl et al.

(10) Patent No.: US 10,922,387 B2
(45) Date of Patent: Feb. 16, 2021

(54) METHOD AND CONTROL SYSTEM FOR CONTROLLING AN EXECUTION OF A SOFTWARE APPLICATION ON AN EXECUTION PLATFORM

(71) Applicant: SFNT GERMANY GMBH, Munich (DE)

(72) Inventors: Werner Dondl, Munich (DE); Andreas Lange, Munich (DE); Michael Zunke, Munich (DE)

(73) Assignee: SFNT GERMANY GMBH, Munich (DE)

( * ) Notice: Subject to any disclaimer, the term of this patent is extended or adjusted under 35 U.S.C. 154(b) by 280 days.

(21) Appl. No.: 15/537,156

(22) PCT Filed: Dec. 9, 2015

(86) PCT No.: PCT/EP2015/079138
§ 371 (c)(1),
(2) Date: Jun. 16, 2017

(87) PCT Pub. No.: WO2016/096573
PCT Pub. Date: Jun. 23, 2016

(65) Prior Publication Data
US 2017/0372045 A1    Dec. 28, 2017

(30) Foreign Application Priority Data
Dec. 16, 2014   (EP) ..................................... 14198250

(51) Int. Cl.
*G06F 7/04*   (2006.01)
*G06F 21/12*  (2013.01)
(Continued)

(52) U.S. Cl.
CPC .......... *G06F 21/121* (2013.01); *G06F 21/105* (2013.01); *G06F 21/44* (2013.01); *G06F 2221/0704* (2013.01)

(58) Field of Classification Search
CPC ...... G06F 21/105; G06F 21/121; G06F 21/44; G06F 2221/0704
(Continued)

(56) References Cited

U.S. PATENT DOCUMENTS 8,612,971 B1 * 12/2013 Fitzgerald ........... G06F 9/45558
                                                                   718/1
9,395,966 B1 *  7/2016 Watson ...................... G06F 8/60
(Continued)

OTHER PUBLICATIONS

International Search Report (PCT/ISA/210) dated Feb. 19, 2016, by the European Patent Office as the International Searching Authority for International Application No. PCT/EP2015/079138.
(Continued)

*Primary Examiner* — Gary S Gracia
(74) *Attorney, Agent, or Firm* — Buchanan Ingersoll & Rooney PC

(57) ABSTRACT

A method for controlling execution of a software application a) determining the point in time of at least one installation of an operation system, installation of a computer program, updating of the operation system, updating of the computer program, b) generating platform information based on the installed/updated system/program and the determined point in time, c) generating a first fingerprint based on the platform information, which is characteristic for the execution platform at the determined time, d) generating a license including said first fingerprint, which defines terms of allowed execution of the software application, and e) controlling the execution by—determining platform information used for generating the first fingerprint and generating a second fingerprint based on said platform information—comparing
(Continued)

Figure 1:
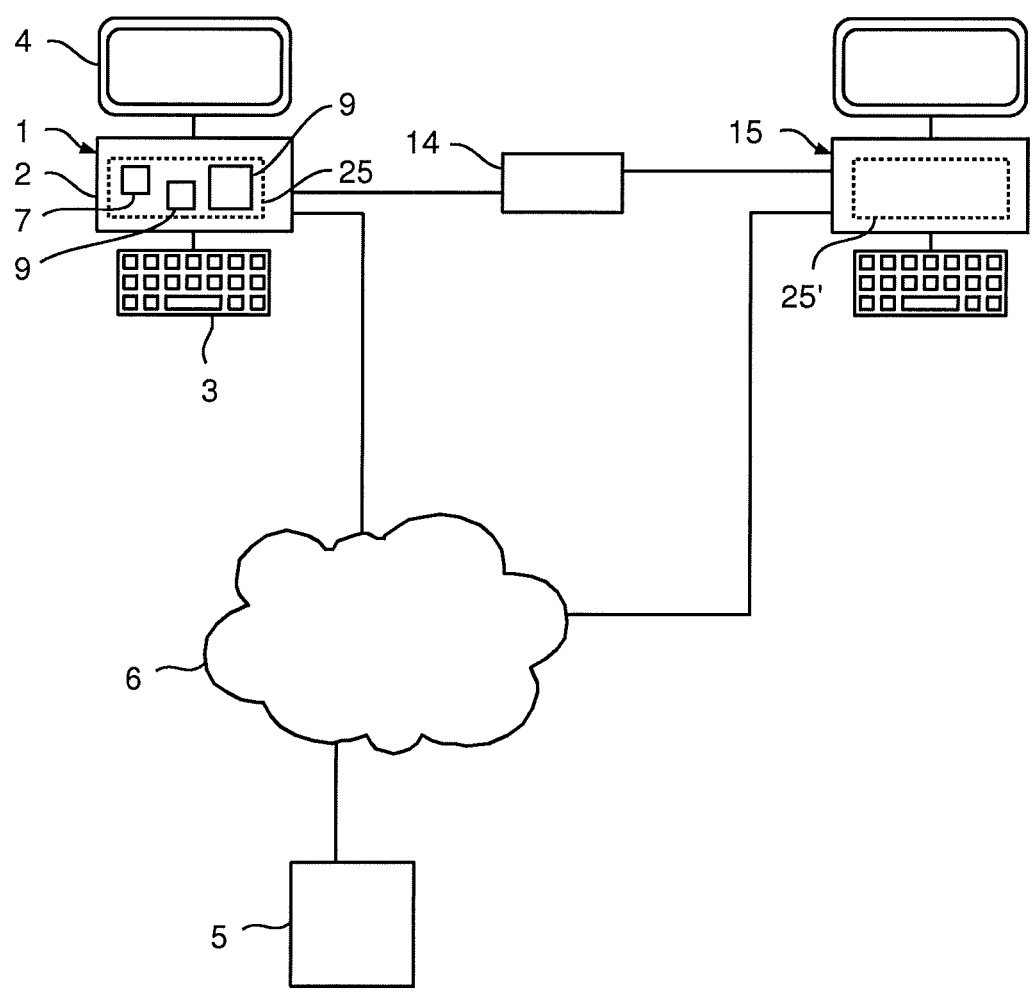

the second fingerprint with the first fingerprint, and—allowing execution of the software application if the second fingerprint complies with the first fingerprint.

12 Claims, 3 Drawing Sheets

(51) Int. Cl.
*G06F 21/44* (2013.01)
*G06F 21/10* (2013.01)
*H04N 7/16* (2011.01)

(58) Field of Classification Search
USPC .................. 726/26, 27; 713/1, 188; 386/256
See application file for complete search history.

(56) References Cited

U.S. PATENT DOCUMENTS

| | | | | |
|---|---|---|---|---|
| 2004/0128395 | A1* | 7/2004 | Miyazaki | G06F 21/10 709/229 |
| 2005/0138397 | A1* | 6/2005 | Kusudo | H04N 21/4181 713/188 |
| 2005/0289072 | A1* | 12/2005 | Sabharwal | G06F 21/121 705/59 |
| 2007/0107067 | A1* | 5/2007 | Fountian | G06F 21/10 726/33 |
| 2007/0266446 | A1* | 11/2007 | Aaron | G06F 21/10 726/30 |
| 2008/0134176 | A1* | 6/2008 | Fitzgerald | G06F 11/0751 718/1 |
| 2008/0172560 | A1* | 7/2008 | Hughes | H04L 63/12 713/176 |
| 2009/0241105 | A1* | 9/2009 | Perrone | G06F 9/45558 717/174 |
| 2010/0058314 | A1* | 3/2010 | Wang | G06F 11/0766 717/168 |
| 2010/0229000 | A1* | 9/2010 | Png | G06F 21/10 713/190 |
| 2010/0325427 | A1* | 12/2010 | Ekberg | H04L 9/3263 713/156 |
| 2010/0325734 | A1* | 12/2010 | Etchegoyen | G06F 21/121 726/26 |
| 2011/0225417 | A1 | 9/2011 | Maharajh et al. | |
| 2013/0004142 | A1* | 1/2013 | Grab | H04N 21/25816 386/259 |
| 2013/0151861 | A1* | 6/2013 | Gan | G06F 21/125 713/189 |
| 2014/0033193 | A1* | 1/2014 | Palaniappan | G06F 21/57 717/173 |

OTHER PUBLICATIONS

Written Opinion (PCT/ISA/237) dated Feb. 19, 2016, by the European Patent Office as the International Searching Authority for International Application No. PCT/EP2015/079138.

* cited by examiner

Fig. 3

| name | installation/update | point in time | |
|---|---|---|---|
| internet browser 7 | update | t1 | 11 |
| PDF reader 8 | installation | t2 | 12 |
| PDF reader 8 | update | t3 | 13 |

(10)

Fig. 4

| name | installation/update | point in time | |
|---|---|---|---|
| internet browser 7 | update | t4 | 17 |
| PDF reader 8 | installation | t2 | 18 |
| PDF reader 8 | update | t5 | 19 |

(16)

Fig. 5

| name | installation/update | point in time | |
|---|---|---|---|
| internet browser 7 | update | t1 | 21 |
| PDF reader 8 | installation | t2 | 22 |
| PDF reader 8 | update | t3 | 23 |
| PDF reader 8 | update | t6 | 24 |

(20)

Fig. 6

| name | installation/update | point in time | |
|---|---|---|---|
| internet browser 7 | update | t1 | 21 |
| PDF reader 8 | installation | t2 | 22 |
| PDF reader 8 | update | t3 | 23 |
| PDF reader 8 | update | t7 | 24' |

(20')

METHOD AND CONTROL SYSTEM FOR CONTROLLING AN EXECUTION OF A SOFTWARE APPLICATION ON AN EXECUTION PLATFORM

The present invention relates to a method and a control system for controlling an execution of a software application on an execution platform.

It is known to control the execution of a software application such that an execution is only allowed in case of the presence of a corresponding license. The license can be locked to a secure hardware device to be connected to the execution platform. In this case the execution can be carried out only in case of the presence of the connected secure hardware device. Since in this case the software publisher or vendor has to deliver the software application and the secure hardware device to the end user, this kind of protection is preferred for expensive software applications.

For less expensive software applications it is often preferred to lock the license to the hardware of the execution platform.

However, if the software application is to be executed into a virtual machine running on the hardware on the execution platform the hardware of the execution platform can often no longer be used for locking the license.

In view thereof, it is object of the invention to provide an improved method for controlling an execution of a software application on an execution platform. Further, an improved control system for controlling an execution of a software application on an execution platform is to be provided.

The object solved by a method for controlling an execution of a software application on an execution platform, comprising:
a) determining the point in time of at least one of the following list: installation of an operation system on the execution platform, installation of a computer program running on the execution platform, updating of the operation system, updating of the computer program,
b) generating at least one platform information item based on the installed/updated operation system/computer program and the determined point in time according to step a),
c) generating a first fingerprint based on the platform information item(s) of step b), said first fingerprint is characteristic for the execution platform at the time of carrying out step a),
d) generating a license including said first fingerprint, said license defines terms of allowed execution of the software application on said execution platform, and
e) controlling the execution by
   determining at least some of the platform information item(s) as used for generating the first fingerprint at the time of executing the software application and generating a second fingerprint based on said platform information item(s),
   comparing the second fingerprint with the first fingerprint of the license, and
   allowing the execution of the software application according to the terms of the license in case of the second fingerprint complies with the first fingerprint, and
   preventing the execution of a software application in case of the second fingerprint does not comply with the first fingerprint.

According to the method of the invention the license is locked to an installation and/or update pattern of the execution platform which is unique for the execution platform so that an effective control of the execution of the software application can be carried out. In particular, even if the software application is executed in a virtual machine an effective control can be provided. Therefore, the license is no longer locked to specific hardware features of the execution platform but to the unique installation and/or update pattern of the execution platform provided for the software application.

The installation and/or update pattern is considered to be unique since today an execution platform receives a nearly constant stream of updates to the operating system and to the installed computer programs and the point in time when this stream of updates is applied depends on a whole range of more or less random circumstances.

An execution platform can be a single computer, a virtual machine, a distributed computer system, a part of a global or of a local network or any other hardware device and/or software providing an environment in which the software application can be executed. Further examples of an execution platform are smartphones, tablets, laptops, desktops, etc.

According to the present invention two fingerprints comply with each other when the two fingerprints (at least partly) match or are (at least partly) the same, for example.

Steps a)-d) are preferably carried out when installing the software application and/or when activating the software application.

Step e) can be carried out when the execution of the software application starts and/or during the execution of the software application. In particular, step e) can be carried out for multiple times (for example periodically).

The execution platform can provide a virtual machine for the execution of the software application and the allowance according to step e) can be given for the execution of the software application within the virtual machine.

Each platform information item can include the information that an installation or an update was carried out, that the operation system (in particular which operation system and/or which version of the operation system) or a computer program (in particular which computer program and/or which version of the computer program) was installed or updated and the point in time when the installation or update took place.

The first fingerprint can include at least two different platform information items and the compliance of the two fingerprints is considered as being present if at least one of the two platform information items is the same in both fingerprints.

According to the method of the present invention during the execution of the software application and after generation of the second fingerprint at least some of the platform information item(s) as used for generating the first fingerprint can be determined and a further fingerprint based on these platform information item(s) can be generated and the further fingerprint can be compared with the first fingerprint of the license and the execution of the software application is allowed according to the terms of the license in case of the further fingerprint complies with the first fingerprint and the execution of the software application is prevented in case of the further fingerprint does not comply with the first fingerprint.

Further, during the execution of the software application and after generation of the second fingerprint at least some of the platform information item(s) as used for generating the first fingerprint can be determined and a further fingerprint based on these platform information item(s) can be generated and a new license including the further fingerprint can be generated only in case the further fingerprint complies with the first fingerprint, wherein the new license is used for carrying out step e).

The generation of the license as well as the generation of the new license can be carried out by a license server which can be remote to the execution platform. In particular, the license server can be accessed through a communication connection such as the internet.

According to the method of the invention during the execution of a software application and after generation of the second fingerprint at least some of the platform information item(s) as used for generating the first fingerprint can be determined and a further fingerprint can be generated based on these platform information item(s), wherein it can be concluded that an unauthorized use of the software application is present if the number of updates and/or the update rate in the further fingerprint lies above a threshold which depends on the number of platform information items used for the first fingerprint and the further fingerprint. An unusual high number of updates and/or update rate is an indication of a cloned virtual machine for executing the software application, since after cloning a virtual machine all missing updates for the computer programs running in the cloned virtual machine are usually carried out. In particular, a heuristic analysis can be carried out to determine whether an unusual high number of updates and/or update rate occurred.

According to the method of the invention during the execution of the software application and after generation of the second fingerprint at least some of the platform information item(s) as used for generating the first fingerprint can be determined and a further fingerprint can be generated based on these platform information item(s), wherein the further fingerprint can be sent to a license server which compares the further fingerprint with at least one of the first fingerprint and the second fingerprint and which concludes that an unauthorized use of the software application is present in case the compared fingerprints do not comply.

According to the method of the invention during the execution of the software application and after generation of the second fingerprint at least some of the platform information item(s) as used for generating the first fingerprint can be determined and a further fingerprint can be generated based on these platform information item(s), wherein the further fingerprint can be sent to a license server which has a database with at least one reference fingerprint of the software application, which compares the further fingerprint with the at least one reference fingerprint and which concludes that an unauthorized use of the software application is present in case the compared fingerprints do not comply.

The first and/or second fingerprint can be a reference fingerprint in the database. Further, in case the further fingerprint complies with the reference fingerprint the further fingerprint can be added as a further reference fingerprint to the database.

These steps can be repeatedly carried out so that an ongoing control of the execution of the software application can be realized.

It can be assumed that the compared fingerprints do not comply in case only platform information item(s) until a specific point in time coincide (are the same in both fingerprints) and the remaining platform information items(s) after this specific point in time do not coincide. This can happen if the software application is executed in a virtual machine and a second execution of the software application takes place in a cloned virtual machine.

The fingerprints and/or the license can be signed and/or encrypted. In this case, a check of the signature and/or a decryption step is carried out before comparing two fingerprints.

The software application can include a module for carrying out the steps of the inventive method. It is further possible to provide a separate license managing module for carrying out step e) in cooperation with the software application to be controlled.

There is further provided a computer program product which comprises software code in order to carry out the steps of the claimed method (including the claimed further developments), when the product is being executed.

Further, a non-transitory computer readable storage medium is provided, which comprises software code executable on a computer to cause the computer to carry out the claimed method (including the claimed further developments).

There is further provided a control system for controlling an execution of a software application on an execution platform, comprising a control module operative to:
a) determine the point in time of at least one of the following list: installation of an operation system on the execution platform, installation of a computer program running on the execution platform, updating of the operation system, updating of the computer program,
b) generate at least one platform information item based on the installed/updated operation system/computer program and the determined point in time according to step a),
c) generate a first fingerprint based on the platform information item(s) of step b), said first fingerprint is characteristic for the execution platform at the time of carrying out step a),
d) generate a license including said first fingerprint, said license defines terms of allowed execution of the software application on said execution platform, and
e) control the execution by
determining at least some of the platform information item(s) as used for generating the first fingerprint at the time of executing the software application and generating a second fingerprint based on said platform information item(s),
comparing the second fingerprint with the first fingerprint of the license, and
allowing the execution of the software application according to the terms of the license in case of the second fingerprint complies with the first fingerprint, and
preventing the execution of a software application in case of the second fingerprint does not comply with the first fingerprint.

The control module can be embodied such that it carries out steps a) to e).

The control system can comprise features for carrying out steps of the inventive method (including steps of the further developments of the inventive method). In particular, the control module can be software and/or hardware. The method for controlling an execution of a software application on an execution platform can comprise the method steps described in connection with the inventive control system.

It is understood that the features named above and still to be explained below can be used not only in the given combinations, but also in other combinations or alone, without departing from the scope of the present invention.

Figure 2:
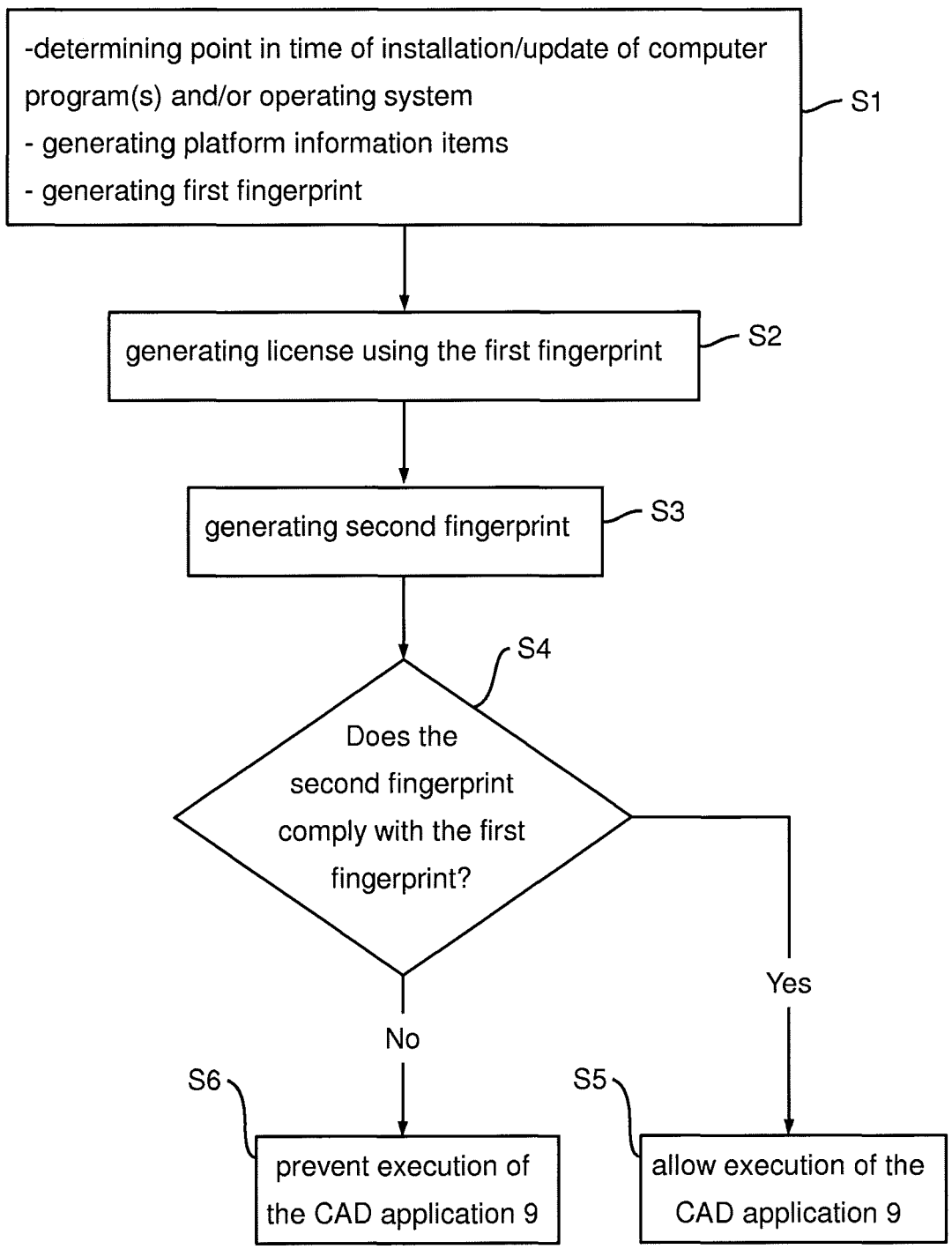

The invention is explained in further detail below by way of example using the attached drawings which also disclose features essential to the invention. There are shown in:

FIG. 1 schematically shows an execution platform 1 for executing software applications;

FIG. 2 shows a flow chart for an embodiment of the method for controlling an execution of the software application on the execution platform 1 shown in FIG. 1, and FIGS. 3 to 6 show different installation/update lists 10, 16, 20, 20' used in embodiments of the present invention.

FIG. 1 schematically shows an execution platform 1 for executing software applications. The execution platform 1 is embodied as a conventional personal computer, for example, comprising a computing section 2 (comprising, for example, a processor, a hard disc, further hardware elements as well as an operating system), an input unit (in this case, for example, a keyboard) as well as an output unit 4 (e.g. a screen). The execution platform 2 can communicate with a license server 5. The communication can be realized via the internet 6, for example.

There are at least three software applications 7, 8, 9 running on the execution platform 1. The software application 7 is an Internet browser, the software application 8 is a PDF reader and the software application 9 is a CAD application. In order to better distinguish between the CAD application 9 on the one hand and the internet browser 7 and the PDF reader 8 on the other hand, the internet browser 7 and the PDF reader 8 can be named computer programs. The execution of the CAD application 9 is controlled as follows in order to avoid unauthorized use.

In order to control the execution of the CAD application 9 on the execution platform 1 a first fingerprint is generated which is characteristic for the execution platform 1 at the time of generating said first fingerprint (step S1 of the flow chart according to FIG. 2).

For generating the first fingerprint an installation/update list 10 is generated by determining the point in time of an installation and/or update of at least one computer program 7, 8 running on the execution platform 1 and/or of the operating system running on the execution platform 1. In the present embodiment the installation/update list 10 (FIG. 3) includes three platform information items 11, 12 and 13. Each platform information item 11-13 includes the name of the computer program, the information, whether an update or an installation was carried out and the point in time of the update or the installation. As shown in FIG. 3 the first platform information item 11 refers to the update of the internet browser 7. The second platform information item 12 refers to the installation of the PDF reader 8 and the third platform information item 13 refers to the update of the PDF reader 8.

The platform information items 11-13 form a unique pattern for the execution platform 1 at the point in time of generating the installation/update list 10. This is a result of the fact that today execution platforms 1 receive a nearly constant stream of updates to the operating system and the installed computer programs. The point in time when this stream of updates is applied depends on a whole range of more or less random circumstances, as for example when the execution platform is running and is online (connected to the internet, for example), which update settings are applied, which place in the update queue the execution platform 1 got and when the execution platform 1 checks for updates. Based on the platform information items 11-13 a first fingerprint is generated which is characteristic for the execution platform 1 at the time of determining the information for generating the installation/update list 10.

The step of determining the first fingerprint is preferably carried out when the CAD application 9 is to be executed for the first time on the execution platform 1.

Thereafter, a license including the first fingerprint is generated (step S2). The generation of the license can be carried out, for example, by sending the first fingerprint to the license server 5 (for example via the internet 6). The license server 5 signs and/or encrypts the first fingerprint (preferably in an automatic process) and sends it back to the execution platform 1 or to a software management system 14 connected to the execution platform 1 (FIG. 1). The license can include the allowed terms of use of the CAD application 9. The terms of use, which are preferably also signed and/or encrypted together with a signed and/or encrypted first fingerprint forms the license for the CAD application 9.

In order to control the execution of the CAD application 9 a second fingerprint is generated (step S3). The second fingerprint can be generated each time the CAD application is started, for example. For generating the second fingerprint the same platform information items as used for generating the first fingerprint are determined at the time of controlling the execution of the CAD application 9 (e.g. when starting the CAD application 9). Since the CAD application 9 is still running on the same execution platform 1 the second fingerprint is identical with the first fingerprint. Therefore, a comparison of both fingerprints (step S4) leads to the result that both fingerprints are identical. In this case, the execution of the CAD application 9 is allowed (step S5).

If, for example, the CAD application is executed on a second execution platform 15 (FIG. 1) the second fingerprint will be different to the first fingerprint, since the platform information items 11-13 will be different as shown in an installation/update list 16 for the second execution platform 15 in FIG. 4. For example, the points in time for updating the internet browser 7 and the PDF reader 8 are different (points in time t4 and t5 instead of t1 and t3). Therefore, the platform information items 11 and 13 of the first installation/update list 10 do not comply with the platform information items 17 and 19 of the second installation/update list 16 and the comparison of the two fingerprints leads to the result, that they are different and therefore the execution of the CAD application 9 is prevented (step S6).

The steps S1-S6 can be carried out by the software management system 14 and/or by a control module included in the CAD application 9 itself.

Further, it is possible that during the execution of the CAD application 9 an actual fingerprint (third fingerprint) is generated and sent to the license server 5. The license server 5 can compare the third fingerprint with the first fingerprint used for generating the license. FIG. 5 shows an example of a third installation/update list 20 for generating the third fingerprint. The third installation/update list 20 includes four platform information items 21 to 24, wherein the first to third platform information items 21-23 comply with the corresponding platform information items 11 to 13 of the first installation/update list 10. In addition, a further update of the PDF reader 8 leads to a further platform information item 24. Due to the fact that the first to third platform information items 21 to 23 are identical with the original first to third platform information items 11 to 13 it is decided that the CAD application software 9 is used in an authorized manner in the first execution platform 1.

If the CAD application 9 is executed in a virtual machine 25 (indicated with dotted lines in FIG. 1) it is still possible to control the execution of the CAD application 9. If, for example, the user of the CAD application 9 has cloned the virtual machine 25 (the cloned virtual machine 25' can be executed on the first or second execution platform 1, 15, for example) the corresponding third fingerprint would be different. The third fingerprint of the original virtual machine 25 can include the platform information items 21 to 24 according to FIG. 5. In the cloned virtual machine 25' the second update of the PDF reader 8 can be carried out at a different time, so that the third installation/update list 20' of the cloned virtual machine 25' would be different with respect to the point in time of the second update of the PDF reader 8 as indicated in FIG. 6 (fourth platform information item 24'). Therefore, it can be concluded that the CAD application 9 is executed in two different execution platforms (here in the virtual machine 25 and in the cloned virtual machine 25') although only a license for the execution on one single execution platform is present. Further, it can be concluded when the execution of the CAD application on two different platforms started at the latest (the more recent point in time of t6 and t7). This information can be used for further steps. For example, corresponding information can be presented when executing the CAD application 9 or no further updates for the CAD application 9 are delivered until the issue of the two separate executions of the CAD application 9 is solved.

In addition, it is possible, to use the third fingerprint for generating a new license. The generation of a new license can be done when the present license is amended or has to be renewed, for example.

When using a Windows operating system the necessary information for generating the installation/update lists 10, 16, 20, 20' can be extracted from the registry. In particular, computer programs are used for generating the installation/update lists 10, 16, 20, 20' which are known to be often updated. For example, a flash player, a PDF reader, an internet browser, JAVA, etc. can be used. As an alternative or in addition computer programs from the program list of the operating system can be used. The computer programs from the program list can be chosen according to predetermined rules.

In case the CAD application 9 can be used during a predetermined time period (e.g. for a free trial period, which might last four weeks) the following situation can occur. After the start of the trial period by carrying out steps S1-S6 a snapshot of the installed CAD application 9 is taken and after the expiry of the trial period the snapshot is copied back to the execution platform 1 so that the user can further use the CAD application 9. However, when copying back such a snapshot the missing updates are normally loaded and installed. This leads to the fact, that an unusual high number of updates are installed. By analysing third installation/update lists (for example by a heuristic analysis) it can be seen whether such a high number of updates happened. If so, it can be concluded that a snapshot was used for extending the trial period and this information can be used for further actions. For example, the execution of the CAD application 9 can be prevented and the user can be informed, that the trial period expired and that he has to purchase a license if he wants to further use the CAD application 9.

In order to detect such a rollback the number of updates and/or the update rate (updates per time) can be analysed.

The invention claimed is:

1. Method for controlling an execution of a software application on an execution platform, the execution platform including at least one hardware processor, the method comprising:
   a) determining, by the at least one hardware processor, a point in time of at least one software update including at least one of the following software updates: installation of an operation system on the execution platform, installation of at least one computer program running on the execution platform, updating of the operation system, and updating of the at least one computer program,
   b) generating, by the at least one hardware processor, at least one platform information item based on the at least one software update and the determined point in time according to the step a),
   c) generating, by the at least one hardware processor, a first fingerprint based on the at least one generated platform information item of the step b), said first fingerprint being characteristic for the execution platform at the time of carrying out the step a), said first fingerprint being related to the at least one software update,
   d) generating a license including said first fingerprint, said license defining terms of an allowed execution of the software application on said execution platform, and
   e) controlling, by the at least one hardware processor, the execution of the software application by:
      determining at least one of the at least one generated platform information item as used for generating the first fingerprint at the time of executing the software application and generating a second fingerprint based on the at least one determined platform information item,
      comparing the second fingerprint with the first fingerprint of the license, and
      allowing the execution of the software application according to the terms of the license only when the second fingerprint complies with the first fingerprint.

2. Method according to claim 1, wherein the execution platform provides a virtual machine for the execution of the software application and the allowance according to the step e) is given for the execution of the software application within the virtual machine.

3. Method according to claim 1, wherein the first fingerprint includes at least two different platform information items and wherein in the step e) the compliance of the two fingerprints is considered as being present if at least one of the two platform information items is the same in both fingerprints.

4. Method according to claim 1, wherein, during the execution of the software application and after generation of the second fingerprint, at least one of the at least one generated platform information item as used for generating the first fingerprint is determined and a further fingerprint based on the at least one determined platform information item is generated and the further fingerprint is compared with the first fingerprint of the license and the execution of the software application is allowed according to the terms of the license only in case of the further fingerprint complies with the first fingerprint.

5. Method according to claim 1, wherein, during execution of the software application and after generation of the second fingerprint, at least one of the at least one generated platform information item as used for generating the first fingerprint is determined and a further fingerprint based on the at least one determined platform information item is generated and a new license including the further fingerprint is generated only in case the further fingerprint complies with the first fingerprint, wherein the new license is used for carrying out the step e).

6. Method according to claim 1, wherein, during the execution of the software application and after generation of the second fingerprint, at least one of the at least one generated platform information item as used for generating the first fingerprint is determined and a further fingerprint is generated based on the at least one determined platform information item, and wherein it is concluded that an unauthorized use of the software application is present if the number of updates in the further fingerprint lies above a threshold which depends on the number of the at least one generated platform information item used for the first fingerprint and the number of the at least one determined platform information item used for the further fingerprint.

7. Method according to claim 1, wherein, during the execution of the software application and after generation of the second fingerprint, at least one of the at least one platform information item as used for generating the first fingerprint is determined and a further fingerprint is generated based on the at least one determined platform information item, and wherein it is concluded that an unauthorized use of the software application is present if the update rate in the further fingerprint lies above a threshold which depends on the number of the at least one generated platform information item used for the first fingerprint and the number of the at least one determined platform information item used for the further fingerprint.

8. Method according to claim 1, wherein, during the execution of the software application and after generation of the second fingerprint, at least one of the at least one generated platform information item as used for generating the first fingerprint is determined and a further fingerprint is generated based on the at least one determined platform information item, and wherein the further fingerprint is sent to a license server which compares the further fingerprint with at least one of the first and second fingerprints and which concludes that an unauthorized use of the software application is present in case the compared fingerprints do not comply.

9. Method according to claim 1, wherein, during the execution of the software application and after generation of the second fingerprint, at least one of the at least one generated platform information item as used for generating the first fingerprint is determined and a further fingerprint is generated based on the at least one determined platform information item, and wherein the further fingerprint is sent to a license server which has a database with at least one reference fingerprint of the software application, which compares the further fingerprint with the at least one reference fingerprint and which concludes that an unauthorized use of the software application is present in case the compared fingerprints do not comply.

10. Method according to claim 1, wherein the compared fingerprints do not comply in case only at least one generated platform information item and at least one determined platform information item until a specific point in time coincide and the remaining of the at least one generated platform information item and the remaining of the at least one determined platform information item after this specific point in time do not coincide.

11. A non-transitory computer-readable medium encoded with a computer program product, which comprises software code in order to carry out the steps of claim 1, when the product is being executed.

12. Control system for controlling an execution of a software application on an execution platform, the execution platform including at least one hardware processor, the control system comprising:

a hardware control module configured to:
   a) determine a point in time of at least one software update including at least one of the following software updates: installation of an operation system on the execution platform, installation of at least one computer program running on the execution platform, updating of the operation system, and updating of the at least computer program,
   b) generate at least one platform information item based on the installed/updated operation system/computer program and the determined point in time according to the step a),
   c) generate a first fingerprint based on the at least one generated platform information item of the step b), said first fingerprint being characteristic for the execution platform at the time of carrying out the step a), said first fingerprint being related to the at least one software update
   d) generate a license including said first fingerprint, said license defining terms of allowed execution of the software application on said execution platform, and
   e) control the execution of the software application by:
      determining at least one of the of the at least one generated platform information item as used for generating the first fingerprint at the time of executing the software application and generating a second fingerprint based on the at least one determined platform information item,
      comparing the second fingerprint with the first fingerprint of the license, and
      allowing the execution of the software application according to the terms of the license only when the second fingerprint complies with the first fingerprint.

* * * * *